United States Patent [19]

Rogers et al.

[11] Patent Number: 4,701,330

[45] Date of Patent: Oct. 20, 1987

[54] PRESERVATION OF THE GREEN COLOR OF BLANCHED VEGETABLES

[75] Inventors: Ann M. Rogers, Ramsey, N.J.; Nabil A. El-Hag, Putnam Valley; Soliman Y. K. Shenouda, Tarrytown, both of N.Y.

[73] Assignee: General Foods Corporation, White Plains, N.Y.

[21] Appl. No.: 862,065

[22] Filed: May 12, 1986

[51] Int. Cl.$^4$ .............................................. A23L 1/212
[52] U.S. Cl. .................................... 426/270; 426/615; 426/629; 426/419
[58] Field of Search ............... 426/267, 268, 269, 270, 426/262, 615, 407, 629, 324, 321, 327, 331, 335, 419, 523, 540, 486, 404

[56] References Cited

U.S. PATENT DOCUMENTS

| | | | |
|---|---|---|---|
| 2,186,003 | 1/1940 | Blair | 426/267 |
| 3,183,102 | 5/1965 | Malecki | 426/268 |
| 4,473,591 | 9/1984 | Segner et al. | 426/270 |

Primary Examiner—Raymond N. Jones
Assistant Examiner—Marianne M. Cintins
Attorney, Agent, or Firm—Sam D. Walker; Thomas R. Savoie; Daniel J. Donovan

[57] ABSTRACT

The present invention is concerned with a method for preserving the green color of vegetables stored at refrigeration temperatures wherein vegetables are blanched with water or steam followed by a vacuum treatment for 30 minutes and an immersion treatment of the same while under vacuum in an alkaline solution having a pH of about 8.7 followed by vacuum release, packaging and storing the vegetables under refrigerated condition.

3 Claims, No Drawings

PRESERVATION OF THE GREEN COLOR OF BLANCHED VEGETABLES

FIELD OF INVENTION

The present invention is concerned with preserving the green color of blanched vegetables. More particularly, the present invention is concerned with a method of preserving the green color of blanched vegetables, stored at refrigerated temperatures for extended periods of time.

BACKGROUND OF THE INVENTION

In order to maintain the green color associated with vegetables, strict attention must be paid to the chlorophyll molecule which is responsible for said green color. The presence of an acid environment causes the breakdown of the chlorophyll molecule, hence, the loss of green color. Although most green plant tissues are naturally quite acidic, chlorophyll is bound to lipoproteins which in some way protect it from the acid. During thermal processing, the protein which protects the chlorophyll coagulates exposing the chlorophyll to the adverse effect of the acid.

Numerous attempts have been made to protect the chlorophyll, such as neutralizing a portion of the acid and thus raising the pH of the plant tissue in question by the addition of an alkali. For instance, U.S. Pat. No. 1,201,666 by Werner teaches that the addition of small quantities of an alkaline substance to green vegetables prevents the impairment or destruction of the greenish tinge associated therewith.

Also, U.S. Pat. No. 2,390,468 by Shroder et al. describes a treatment of green vegetables by cooling them immediately after blanching and applying a slightly alkaline solution to the vegetables for a time, then packaging said vegetables in a slightly alkaline solution of magnesium carbonate. Other references such as U.S. Pat. No. 2,520,214 by Kenworthy Jr., U.S. Pat. No. 2,186,003 by Blair and U.S. Pat. No. 2,189,774 also by Blair disclose the treatment of vegetables at different intervals in their processing with an alkaline solution.

The above references are concerned more with the treatment of green vegetables with an alkaline solution and less with the removal of oxygen from the surface of the green vegetables which further degrades the chlorophyll during low temperature, refrigeration storage. In the present invention the surface micro air layer is removed and replaced with de-aerated water.

It is, therefore, the object of the present invention to preserve the green color of blanched vegetables.

A further object of the present invention is a process for preserving the green color of blanched vegetables stored at refrigeration conditions for extended periods of time.

SUMMARY OF THE INVENTION

The present invention is concerned with a process for retaining the green color of blanched vegetables comprising the steps of first blanching the green vegetables followed immediately by exposing the blanched green vegetables to a vacuum, and while under a vacuum submerging the blanched green vegetables in alkaline de-aerated water and finally releasing the vacuum, drain the vegetables and store under refrigerated conditions for extended periods of time.

DETAILED DESCRIPTION

The present invention is particularly concerned with preserving the green color of blanched vegetables stored at refrigeration temperatures in excess of 21 days. The technique involved in accomplishing this is referred to as imbibition. By imbibition is meant: a process wherein the surface micro air layer is pulled or removed from the vegetable by vacuum and replaced with de-aerated water.

The vegetablres utilized in the present invention may be any chlorophyll containing green vegetable such as broccoli, asparagus, spinach, snow peas, green pepper and the like.

The desired result of the present invention is accomplished by a series of steps, the first being a blanching step. In blanching, the vegetables are exposed to water or steam having temperatures ranging from 150° F. to 212° F. for a suitable length of time. This time element varies somewhat with the type of vegetable and whether or not the blanching medium is steam or water. In the case of water, the blanching time should generally range from ½ to 5 minutes, while in the case of steam, the blanching time should generally range from 10 seconds to 3 minutes.

It is preferred, however, to utilize water blanching, since water is amenable to certain processing modification, such as the formation of a mildly alkaline solution by the addition of an alkaline. For instance, broccoli when subjected to mild alkaline treatment during blanching results in a greener product when compared to the results of regular water-blanched broccoli. The mild alkali solution may be obtained by dissolving sodium bicarbonate in water or by suspending magnesium hydroxide or calcium hydroxide or mixture thereof in water.

The blanched vegetables are then exposed to a vacuum by creating a negative pressure within an enclosed environment, thereby removing all the air present therein. This further removes the surface micro air layer adjacent to the vegetables. The presence of air in the micro layers on the surface of the vegetables causes oxidation of the chlorophyll and affect a color change from bright green to greenish yellow, particularly when held at refrigeration temperature.

The vegetables should be exposed to a vacuum for a time sufficient to remove the entire surface micro air layer. This is accomplished by maintaining a vacuum of from 19 inch Hg. to 29 inch Hg. for a time of up to about 45 minutes and preferably from 10 minutes to 25 minutes.

While under vacuum the blanched green vegetables are contacted with de-aerated water for a time sufficient to replace the surface micro air layer with said de-aerated water. This is accomplished by completely submerging the green vegetable into de-aerated water having a pH ranging from 7.2 to 9.5 for a time ranging from 5 minutes to 30 minutes. It is preferred, however, that the pH of the de-aerated water be in the alkaline range of about pH 8.2 to 8.7 and the time of exposure be about 5 minutes.

Conventionally, it has been known to treat green vegetables with an alkaline solution to preserve its green color (supra). However, the presence of trapped air within the micro air layer on the surface of the vegetables causes color deteriation under refrigeration storage, even when the vegetable is treated with an alkaline solution. The present invention removes the micro air layer from the surface of the green vegetables by subjecting same to a vacuum and replacing this layer with alkaline de-aerated water thereby decreasing the likelihood of deterioration.

It is an important feature of the present invention that the vegetables be submerged in alkaline de-aerated water while under vacuum. The vacuum will remove substantially all the trapped air on the surface of the vegetables thereby creating an oxygen-free environment to be replaced with alkaline de-aerated water.

It is necessary to control the concentration and temperature of the alkaline bath in order that the reaction does not proceed beyond the desired point. This process contemplates the adjustment of the pH of the vegetable upward by about 0.005 to 0.1 from its natural pH. The alkaline solution is prepared by first removing all the air present in the water and then adjusting the pH of the water to the desired level. The pH adjustment is accomplished by adding an alkaline material to the de-aerated water in the manner described above.

After the addition of alkaline de-aerated water to the vegetable under vacuum, the vacuum is removed and the vegetables drained and packed for storage. Storage in the present invention means that the product is kept at between about 32° F. and 45° F. for greater than 21 days.

The following table is meant to illustrate the relationship between vacuumizing and treatment with de-aerated water with the length of storage time (maintain green color).

|   | Storage Temp. In °F. | Length of Storage Time 14 days | Maintain Green Color |
|---|---|---|---|
| (1) Blanching only | 35 | 4 | up to 4 days |
| (2) Blanching and vacuumizing and immerging in de-aerated water | 35 | 15 | up to 15 days |
| (3) Blanching and vacuumizing and immerging in alkaline de-areated water | 35 | 21 | up to 21 days |
| (4) Same as #3 but blanching in alkaline water | 35 | 21 | up to 21 days |
| (5) Blanching and package with oxygen scavenger | 35 | 4 | up to 4 days |

EXAMPLE I

Fresh broccoli was blanched in boiling water having a temperature of 212° F. for 2 minutes. The blanched broccoli was then placed in a vacuum chamber and vacuumize for 30 minutes. The vacuumized broccoli while still under vacuum was then immersed in deareated water having a pH of 8.9 for thirty minutes. The vacuum was then released and the broccoli drained, packed in a modified atmosphere of $CO_2/N_2$ and store at 35° F. This product had a bright green color for an extended refrigerated shelf-life beyond 21 days.

What is claimed is:

1. A process for retaining the green color of blanched vegetables stored under refrigerated conditions comprising the steps of:
   (a) blanching green vegetables at a temperature of from 150° F. to 212° F.;
   (b) exposing the blanched green vegetables to a vacuum at a pressure of from 19 inch Hg. to 29 inch Hg. for a period of time sufficient to remove the entire surface micro air layer of said blanched green vegetables;
   (c) completely submerging the blanched green vegetables while under vacuum into alkaline de-aerated water having a pH ranging from 7.2 to 9.5 for a time ranging from 5 to 30 minutes; and
   (d) draining the vegetables and storing under refrigerated temperature of from 32° F. to 45° F. for a period of time up to 21 days.

2. A process according to claim 1 wherein the green vegetable is a member selected from the group consisting of asparagus, spinach, snow peas, green peppers, broccoli and combinations thereof.

3. A process according to claim 1 wherein the green vegetable is blanched in boiling water or steam for from 1 minute to 3 minutes.

* * * * *